US010921987B1

United States Patent
Armangau et al.

(10) Patent No.: US 10,921,987 B1
(45) Date of Patent: Feb. 16, 2021

(54) DEDUPLICATION OF LARGE BLOCK AGGREGATES USING REPRESENTATIVE BLOCK DIGESTS

(71) Applicant: EMC IP Holding Company LLC, Hopkinton, MA (US)

(72) Inventors: Philippe Armangau, Acton, MA (US); John P. Didier, Westborough, MA (US); Sorin Faibish, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/527,894

(22) Filed: Jul. 31, 2019

(51) Int. Cl.
*G06F 3/06* (2006.01)
*G06F 12/0864* (2016.01)

(52) U.S. Cl.
CPC .......... *G06F 3/0608* (2013.01); *G06F 3/0641* (2013.01); *G06F 3/0659* (2013.01); *G06F 3/0673* (2013.01); *G06F 12/0864* (2013.01)

(58) Field of Classification Search
CPC .. G06F 3/0608; G06F 12/0864; G06F 3/0659; G06F 3/0641; G06F 3/0673
See application file for complete search history.

(56) References Cited

U.S. PATENT DOCUMENTS

| | | | | |
|---|---|---|---|---|
| 8,849,955 | B2 * | 9/2014 | Prahlad | G06F 3/0605 709/219 |
| 9,575,984 | B2 * | 2/2017 | Huang | G06F 3/0641 |
| 9,678,977 | B1 * | 6/2017 | Aronovich | G06F 3/0689 |
| 9,740,729 | B2 * | 8/2017 | Srinivasan | G06F 3/0608 |
| 9,922,039 | B1 | 3/2018 | Armangau et al. | |
| 10,120,595 | B2 * | 11/2018 | Williams | G06F 16/1748 |
| 10,176,102 | B2 * | 1/2019 | Harvey | G06F 11/14 |
| 10,254,989 | B2 * | 4/2019 | Nakajima | G06F 3/0641 |
| 10,255,290 | B2 * | 4/2019 | Harnik | G06F 16/1752 |
| 10,313,311 | B2 * | 6/2019 | Bohli | G06F 3/0608 |
| 2010/0077013 | A1 * | 3/2010 | Clements | G06F 16/1748 707/822 |
| 2011/0055471 | A1 * | 3/2011 | Thatcher | G06F 3/0608 711/114 |
| 2016/0170657 | A1 * | 6/2016 | Suehr | G06F 3/0649 711/162 |
| 2016/0267099 | A1 * | 9/2016 | Huang | G06F 3/067 |
| 2017/0090786 | A1 * | 3/2017 | Parab | G06F 11/1453 |

(Continued)

OTHER PUBLICATIONS

David Geer, "Reducing the Storage Burden via Data Deduplication", Industry Trends, 2008, pp. 15-17, https://ieeexplore.ieee.org/stamp/stamp.jsp?tp=&arnumber=4712493&tag=1 (Year: 2008).*

(Continued)

*Primary Examiner* — Christopher D Birkhimer
(74) *Attorney, Agent, or Firm* — BainwoodHuang

(57) ABSTRACT

A method of performing deduplication includes (1) receiving a write command that specifies a set of data, the set of data including multiple blocks of data, (2) hashing a subset of the set of data, yielding a representative digest of the set of data, and (3) performing deduplication on the set of data based at least in part on matching the representative digest to a digest already stored in a database which relates digests to locations of data from which the digests were produced. An apparatus, system, and computer program product for performing a similar method are also provided.

13 Claims, 4 Drawing Sheets

(56) References Cited

U.S. PATENT DOCUMENTS

| | | | | |
|---|---|---|---|---|
| 2017/0147599 A1* | 5/2017 | Aronovich | ............ | G06F 3/0608 |
| 2017/0147648 A1* | 5/2017 | Aronovich | ............ | G06F 16/128 |
| 2017/0220295 A1* | 8/2017 | Khan | ................. | G06F 16/1748 |
| 2017/0371917 A1* | 12/2017 | Srinivasan | ............ | G06F 3/0641 |
| 2018/0181339 A1* | 6/2018 | Sharma | ................. | G06F 3/0685 |
| 2018/0357132 A1* | 12/2018 | Maranna | ............ | G06F 16/1748 |

OTHER PUBLICATIONS

Philippe Armangau, et al.; "Deduplicating Data At Sub-Block Granularity," U.S. Appl. No. 16/176,729, filed Oct. 31, 2018.
Sorin Faibish, et al.; "Elastically Managing Cache for Sub-Block Deduplication," U.S. Appl. No. 16/176,703, filed Oct. 31, 2018.
Uri Shabi, et al.; "Sub-Block Deduplication Using Sector Hashing," U.S. Appl. No. 16/397,131, filed Apr. 29, 2019.

\* cited by examiner

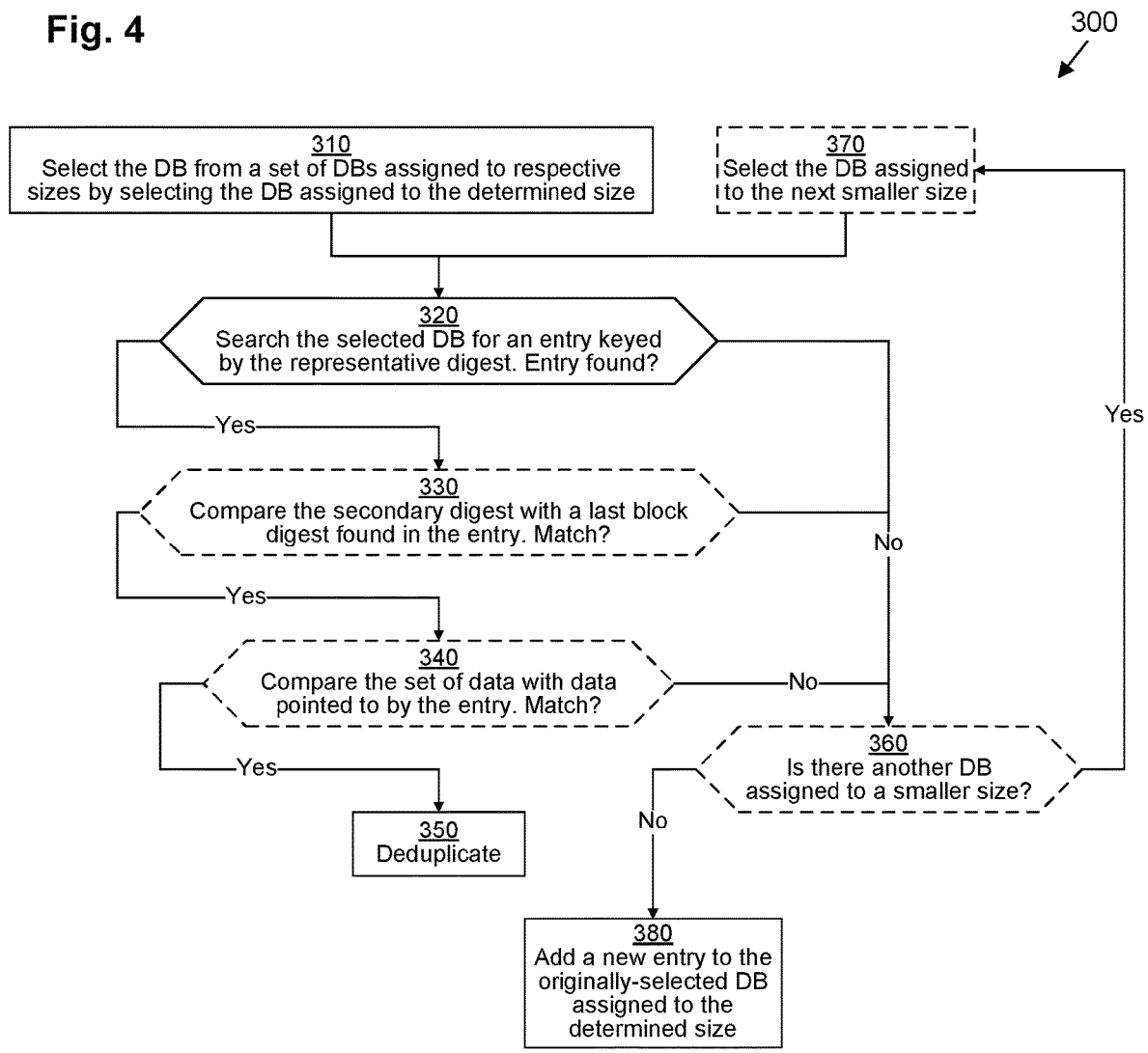

DEDUPLICATION OF LARGE BLOCK AGGREGATES USING REPRESENTATIVE BLOCK DIGESTS

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems support data "deduplication." A common deduplication scheme involves replacing redundant copies of a data block with pointers to a single retained copy. Data deduplication may operate in the background, after redundant data blocks have been stored, and/or operate inline with storage requests. Inline deduplication matches newly arriving data blocks with previously-stored data blocks and configures pointers accordingly, thus avoiding initial storage of redundant copies.

A common deduplication scheme involves computing digests of data blocks and storing the digests in a database. Each digest is computed as a hash of a data block's contents and identifies the data block with a high level of uniqueness, even though the digest is typically much smaller than the data block itself. Digests thus enable block matching to proceed quickly and efficiently, without having to compare blocks byte-by-byte. For each digest, the database stores a pointer that leads to a stored version of the respective data block. To perform deduplication on a particular candidate block, a storage system computes a digest of the candidate block and searches the database for an entry that matches the computed digest. If a match is found, the storage system arranges metadata of the candidate block to point to the data block that the database has associated with the matching digest. In this manner, a duplicate copy of the data block is avoided.

SUMMARY

Conventional deduplication schemes may operate inefficiently when data is received in increments larger than a block. For example, certain Microsoft Windows applications typically write data in 64-kilobyte (KB) increments, even though most storage systems perform deduplication on 4-KB or 8-KB blocks. Such systems may store a digest for each block, even though it may be the entire 64-KB chunk of data that is a duplicate of a previously-stored chunk of data. This results in more metadata being stored than necessary.

Thus, it would be desirable to conduct deduplication at a coarser granularity than the standard block size. This may be accomplished by grouping multiple blocks together into a chunk and using a representative subset of that chunk to generate a hash digest for the entire chunk. This digest can then be used to perform deduplication at a chunk level. In some embodiments, blocks are grouped together based on their being received together in a single write command. In some embodiments, blocks are joined together once the various blocks of a write command have already been broken apart and separately added to a write cache out-of-order and/or commingled with blocks from other writes. Such joining may be achieved by referencing metadata included with each block in the cache to identify what data was received in the write command. In some embodiments, multiple digest databases may be used to store digests for chunks of data of respective sizes (e.g., generated by different applications).

In one embodiment, a method includes (1) receiving a write command that specifies a set of data, the set of data including multiple blocks of data, (2) hashing a subset of the set of data, yielding a representative digest of the set of data, and (3) performing deduplication on the set of data based at least in part on matching the representative digest to a digest already stored in a database which relates digests to locations of data from which the digests were produced. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 4 is a flowchart depicting an example method of various embodiments.

DETAILED DESCRIPTION OF THE INVENTION

Embodiments are directed to techniques for performing deduplication at a coarser granularity than the standard block size. This may be accomplished by grouping multiple blocks together into a chunk and using a representative subset of that chunk to generate a hash digest for the entire chunk. This digest can then be used to perform deduplication at a chunk level. In some embodiments, blocks are grouped together based on their being received together in a single write command. In some embodiments, blocks are joined together once the various blocks of a write command have already been broken apart and separately added to a write cache out-of-order and/or commingled with blocks from other writes. Such joining may be achieved by referencing metadata included with each block in the cache to identify what data was received in the write command. In some embodiments, multiple digest databases may be used to store digests for chunks of data of respective sizes (e.g., generated by different applications).

Figure 1:
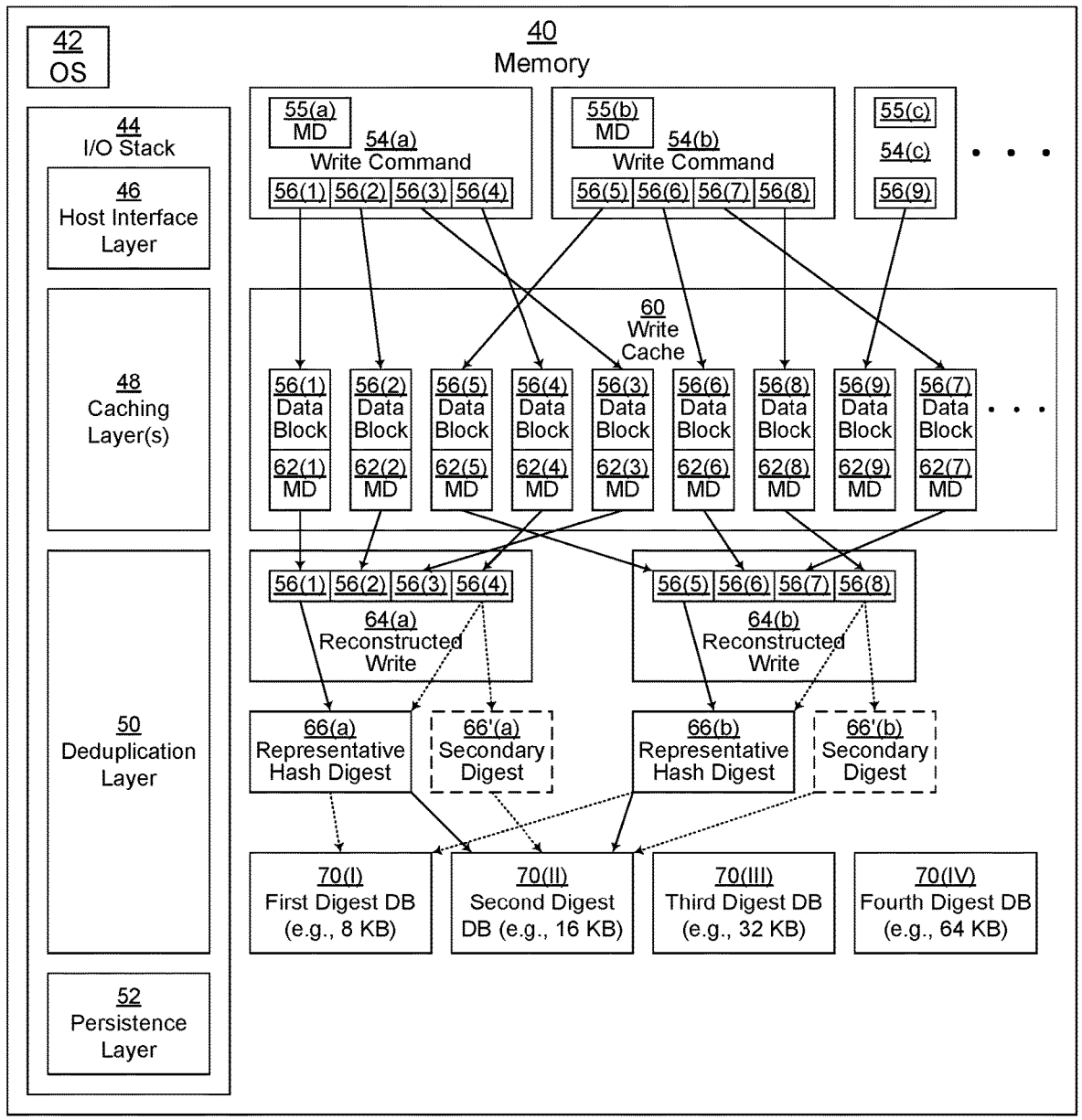
FIG. 1 is a block diagram depicting an example apparatus for use in connection with various embodiments.

FIG. 1 depicts an example data storage environment (DSE) 30. DSE 30 may be any kind of computing device or collection (or cluster) of computing devices or machines, such as, for example, one or more personal computers, workstations, server computers, enterprise servers, data storage arrays, laptop computers, tablet computers, smart phones, mobile computers, etc., or any combination thereof.

DSE 30 includes persistent storage 32, storage interface circuitry 34, processing circuitry 36, network interface circuitry 38, and memory 40.

Persistent storage 32 may include any kind of persistent storage devices, such as, for example, hard disk drives, solid-state storage devices (SSDs), flash drives, NVMe drives, etc. Storage interface circuitry 34 controls and provides access to persistent storage 32. Storage interface circuitry 34 may include, for example, SCSI, SAS, ATA, SATA, FC, M.2, U.2, and/or other similar controllers and ports.

Processing circuitry 36 may include any kind of processor or set of processors configured to perform computerized operations, such as, for example, a microprocessor, a multi-core microprocessor, a digital signal processor, a system on a chip, a collection of electronic circuits, a similar kind of controller, or any combination of the above.

Network interface circuitry 38 may include one or more Ethernet cards, cellular modems, Fibre Channel (FC) adapters, Wireless Fidelity (Wi-Fi) wireless networking adapters, and/or other devices for connecting to a network (not depicted). Network interface circuitry 38 allows the DSE 30 to communicate with one or more host devices (not depicted) running one or more host applications capable of sending data storage commands to the DSE 30 over the network. In some embodiments, a host application may run directly within DSE 30 rather than on an external host device.

In some embodiments, DSE 30 may include one or more processing nodes (not depicted) which connect to persistent storage 32 in a shared configuration. Thus, each processing node may include its own processing circuitry 36, network interface circuitry 38, and memory 40. In some embodiments, the processing nodes may connect to each other via their network interface circuitry 38. In some of these embodiments, each processing node also has its own storage interface circuitry 34 and locally-attached persistent storage 32 that it makes available to the other processing nodes over the network. In other embodiments, all of the processing nodes connect to the persistent storage 32 and storage interface circuitry 34 over a storage bus or network.

In some embodiments, each processing node may be configured as a circuit board assembly or blade which plug into a chassis that encloses and cools the processing nodes and persistent storage 32. The chassis may have a backplane for interconnecting the processing nodes and persistent storage 32, and additional connections may be made among processing nodes using cables.

Memory 40 may include any kind of digital system memory, such as, for example, random access memory (RAM). Memory 40 stores an operating system (OS) 42 in operation (e.g., a Linux, UNIX, Windows, MacOS, or similar operating system). Memory 40 also stores an input/output (I/O) stack 44 in operation, a write cache portion 60, and set of digest databases (DBs) 70.

I/O stack 44 executes on processing circuitry 36 to fulfill data storage requests received from host applications. I/O stack 44 may include various layered drivers, including, for example, a top-level host interface layer 46 at (or near) the top of the I/O stack 44, one or more intermediate caching layers 48, a deduplication layer 50, and a persistence layer 52. I/O stack 44 may also contain addition drivers (not depicted).

In operation, host interface layer 46 receives I/O commands, including write commands 54, from host applications, and, once they have been processed by the I/O stack 44, host interface layer 46 may respond back to the issuing host applications, acknowledging completion.

As depicted, several write commands 54(a), 54(b), 54(c), . . . have been received by the host interface layer 46. Each write command 54 includes metadata (MD) 55 as well as a set of data which may be divided into one or more blocks 56 of data. Blocks 56 have a uniform size. For example, in one embodiment, a standard block is 4 kilobytes (KB) in size, while in another embodiment, a standard block is 8 KB in size. Hereinafter, the block size will be assumed to be 4 KB, although that is by way of example only. Metadata 55 includes various information about the write command 54, including, for example, a timestamp (not depicted), an indication (not depicted) of a particular logical disk to which the data is directed (e.g., a logical unit number or LUN), and a target address (not depicted) on that logical disk at which the data is to be written (e.g., a logical block address, or LBA, to locate the first block 56 on the LUN).

Thus, as depicted, write command 54(a) encodes a request to write 16 KB of data spanning four blocks 56(1), 56(2), 56(3), 56(4). The metadata 55(a) logically encodes where (e.g., which LUN and LBA) the first block 56(1) is to be stored.

Similarly, as depicted, write command 54(b) encodes another request to write 16 KB of data spanning four blocks 56(5), 56(6), 56(7), 56(8). The metadata 55(b) logically encodes where the first block 56(5) is to be stored (e.g., which LUN and LBA). In addition, as depicted, write command 54(c) encodes a request to write 4 KB of data spanning a single block 56(9). The metadata 55(c) logically encodes where that block 56(9) is to be stored (e.g., by specifying a LUN and LBA).

In some embodiments, I/O commands, including write commands 54, are SCSI commands, while in other embodiments, other formats (such as NVMe, for example) may be used instead.

In some embodiments, after host interface layer 46 receives each write command 54, host interface layer 46 may break the write command 54 up into sub-commands (not depicted) and send each sub-command separately down the I/O stack 44 for separate processing. In some embodiments, various sub-commands may be processed by various respective threads, which may execute on various cores of processing circuitry 36. Thus, for example, each block 56 of the write command 54 may be assigned to its own respective sub-command and separately passed down the I/O stack 44.

As depicted, caching layer(s) 48 of I/O stack 44 individually processes each block 56, causing each block 56 to be stored within write cache 60. Because each block 56 is processed independently, the blocks 56 may be placed into the write cache 60 out of order, possibly commingled with blocks 56 from other write commands 54. For example, data block 56(2) is placed into the write cache 60 right after data block 56(1), and data block 56(5) from write command 54(b) is placed into the write cache 60 right after data block 56(2) but before data blocks 56(3) and 56(4) from write command 54(a). In addition, data block 56(4) is placed into the write cache 60 before data block 56(3).

Thus, if the blocks 56 were to be flushed to persistent storage 32 by persistence layer 52 in the order in which they were received in the write cache 60, they would not be written in order. This is similar to how some conventional systems operate. Thus, conventional deduplication, which operates on cached data, might not be effective to properly group together the blocks 56 from a single write command 54 larger than a single block. In addition, the order of the blocks 54 might not be the same as the order in which they were placed in the write command 54.

Therefore, as depicted, when deduplication layer 50 operates on the write cache 60, it makes reference to block metadata 62 stored in connection with each block 56 to logically reorganize the cached blocks 56 into reconstructed writes 64 with the blocks 56 grouped appropriately and in the appropriate order. For example, this metadata 62 may include a timestamp, LUN, and LBA for each block 56. It should be noted that in embodiments in which write commands 54 are processed atomically for insertion into the write cache 60 without being divided into sub-commands, this reconstruction may be omitted.

Deduplication layer 50 also operates to generate a representative hash digest 66 for each reconstructed write 64 (or for each write command 54 if reconstruction is not performed) by hashing a subset of the data of that write 64. This hashing is done by applying a hashing algorithm such as, for example, SHA-2. Other hashing algorithms may be used instead, such as, for example, SHA-0, SHA-1, SHA-3, and MD5. Such algorithms may provide bit-depths such as 128 bits, 160 bits, 172 bits, 224 bits, 256 bits, 384 bits, and 512 bits, for example. Preferably an advanced hashing algorithm with a high bit-depth is used to ensure a low probability of hash collisions.

In some embodiments, the subset of the data that is hashed to generate the representative hash digest 66 is the first block 56 of each reconstructed write 64 (e.g., block 56(1) for reconstructed write 64(a); block 56(5) for reconstructed write 64(b), etc.). In other embodiments, the subset that is hashed to generate the representative hash digest 66 is the first sector (e.g., the first 512 bytes) of each reconstructed write 64. In other embodiments, the subset that is hashed to generate the representative hash digest 66 is a concatenation of the first and last blocks 56 of each reconstructed write 64 (e.g., a concatenation of blocks 56(1) and 56(4) for reconstructed write 64(a); a concatenation of blocks 56(5) and 56(8) for reconstructed write 64(b), etc.).

In some embodiments, in addition to generating a representative hash digest 66 for each reconstructed write 64, deduplication layer 50 may also generate a secondary digest 66' for some of the reconstructed writes 64 using a different subset. Thus, as depicted, secondary digest 66' is generated by hashing the last block 56 of each reconstructed write 64 (e.g., block 56(4) for reconstructed write 64(a); block 56(8) for reconstructed write 64(b), etc.).

Deduplication layer 50 looks up the representative hash digest 66 of each reconstructed write 64 in one or more of the digest DBs 70 in order to decide if the data of that reconstructed write 64 can be deduplicated with respect to previously-written data.

As depicted, there are four digest DBs 70(I), 70(II), 70(III), 70(IV), although there may be more or fewer in other embodiments. Each digest DB 70 is associated with a particular chunk size. Thus, as depicted, first digest DB 70(I) is associated with a chunk size of 8 KB, corresponding to reconstructed writes 64 that contain two data blocks 56. Similarly, second digest DB 70(II) is associated with a chunk size of 16 KB, corresponding to reconstructed writes 64 that contain four data blocks 56; third digest DB 70(III) is associated with a chunk size of 32 KB, corresponding to reconstructed writes 64 that contain eight data blocks 56; and fourth digest DB 70(IV) is associated with a chunk size of 64 KB, corresponding to reconstructed writes 64 that contain sixteen data blocks 56. Each deduplication DB 70 (which may be arranged as a key-value store) stores a set of entries (not depicted), each of which maps a digest key to a pointer that points to the location in persistent storage 32 where data mapped to by that entry is stored.

Since reconstructed writes 64(a), 64(b) both contain four blocks 56, deduplication layer 50 initially looks up their respective representative hash digests 66(a), 66(b) in second digest DB 70(II). If a match is found, then additional steps may be taken to ensure that the match is correct. Thus, in embodiments in which a secondary digest 66' is used, the secondary digest 66' may be calculated and compared to the matching entry as a check that not only does the first block 56 match what was previously stored, but that the last block 56 matches what was previously stored as well. In some embodiments, the entire contents of the reconstructed write 64 are compared to the entire contents of the previously stored chunk (e.g., bit-by-bit, byte-by-byte, or at some other granularity, such as by comparing data in 128-byte segments) to ensure that the chunks are actually the same.

In some embodiments, in the event that the match is not correct, the reconstructed write 64 may be broken down into smaller chunks and then further checking may be performed against the digest DB or DBs 70 for the corresponding sizes.

In the event that no proper match is found, deduplication layer 50 adds a new entry into the appropriate digest DB 70 with the representative hash digest 66 (and, in some embodiments, the secondary digest 66') so that it can be deduplicated against in the future.

It should be understood that some write commands 54 (e.g., 54(c)) may contain only a single block 56. Thus, conventional deduplication may also be performed on the individual data blocks 56 of those write commands 54 with reference to a block-level deduplication DB (not depicted).

Eventually, the data blocks 56 that have not been deduplicated by deduplication layer 50 are flushed to persistent storage (although they may also be retained within cache as "clean" copies for read caching purposes). In addition, metadata of blocks 56 that have been deduplicated is stored in persistent storage 32 indicating that those blocks 56 have been deduplicated, so that their data can be found, as is well-known in the art.

Memory 40 may be configured as a collection of memory pages, each of which has a standard page size, as is known in the art. For example, the page size may be 4 KB, 8 KB, etc. In some example embodiments, the page size is equal to the block size.

Memory 40 may also store various other data structures used by the OS, I/O stack 44, and various other applications (not depicted).

In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 32 is configured to store programs and data even while all or part of the DSE 30 is powered off. The OS 42, applications, I/O stack 44, and digest DBs 70 are typically stored in this persistent storage portion of memory 40 or on persistent storage 32 so that they may be loaded into a system portion of memory 40 upon a system restart or as needed. The I/O stack 44, host interface layer 46, caching layer(s) 48, deduplication layer 50, and persistence layer 52, when stored in non-transitory form either in the volatile portion of memory 40 or on persistent storage 32 or in persistent portion of memory 40, each form a computer program product. The processing circuitry 36 running one or more applications thus forms a specialized circuit constructed and arranged to carry out the various processes described herein.

Figure 2:
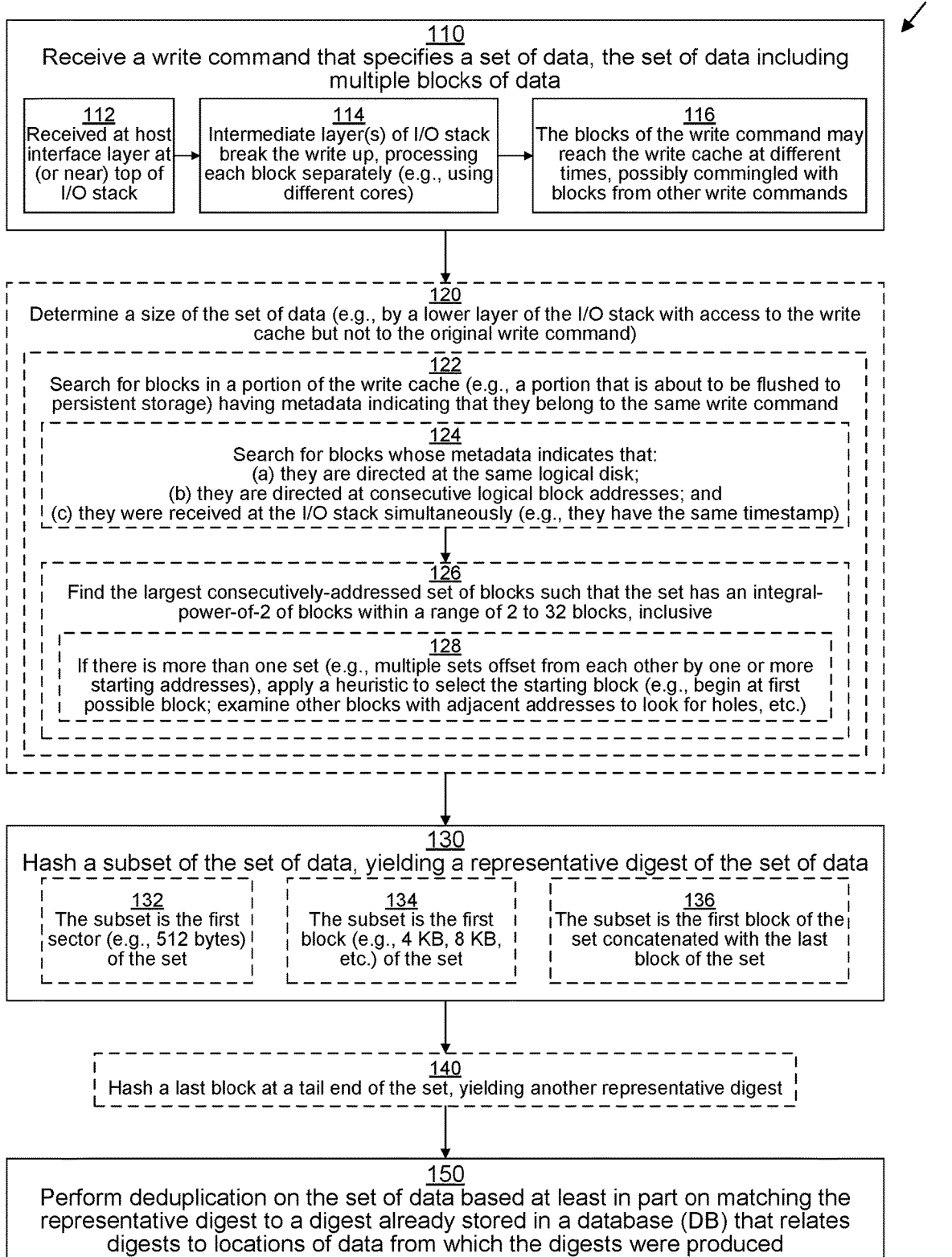
FIG. 2 is a flowchart depicting example methods of various embodiments.

FIG. 2 illustrates an example method 100 performed by DSE 30 for performing inline deduplication of blocks 56 in chunks defined by incoming write commands 54 in accordance with various embodiments. It should be understood that any time a piece of software (e.g, I/O stack 44, host interface layer 46, caching layer(s) 48, deduplication layer 50, or persistence layer 52) is described as performing a method, process, step, or function, what is meant is that a computing device (e.g., DSE 30 or one of its component processing nodes) on which that piece of software is running performs the method, process, step, or function when executing that piece of software on its processing circuitry 36. It should be understood that one or more of the steps or sub-steps of method 100 may be omitted in some embodiments. For example, steps 120 and 140 and sub-steps 122, 124, 126, 128, 132, 134, and 136 are depicted with dashed lines, indicating that they are either optional or representative of alternative embodiments. Similarly, in some embodiments, one or more steps or sub-steps may be combined together or performed in a different order.

In step 110, I/O stack 44 receives a write command 54 that specifies a set of data, the set of data including multiple blocks 56 of data. Write command 54 also includes metadata 55 that provides information about the write aside from the actual data.

In some embodiments, the write command 54, in sub-step 112, is received by a host interface layer 46 at or near the top of the I/O stack 44. Then, in sub-step 114, the write command 54 is broken up into several sub-commands that each process one or more blocks 56 of the write command 54 for insertion into the write cache 60 by caching layers 48. This may result in the blocks 56 of the write command 54 reaching the write cache 60 at different times, possibly commingled with blocks 56 from other write commands 54 and possibly out of order (sub-step 116).

Figure 3:
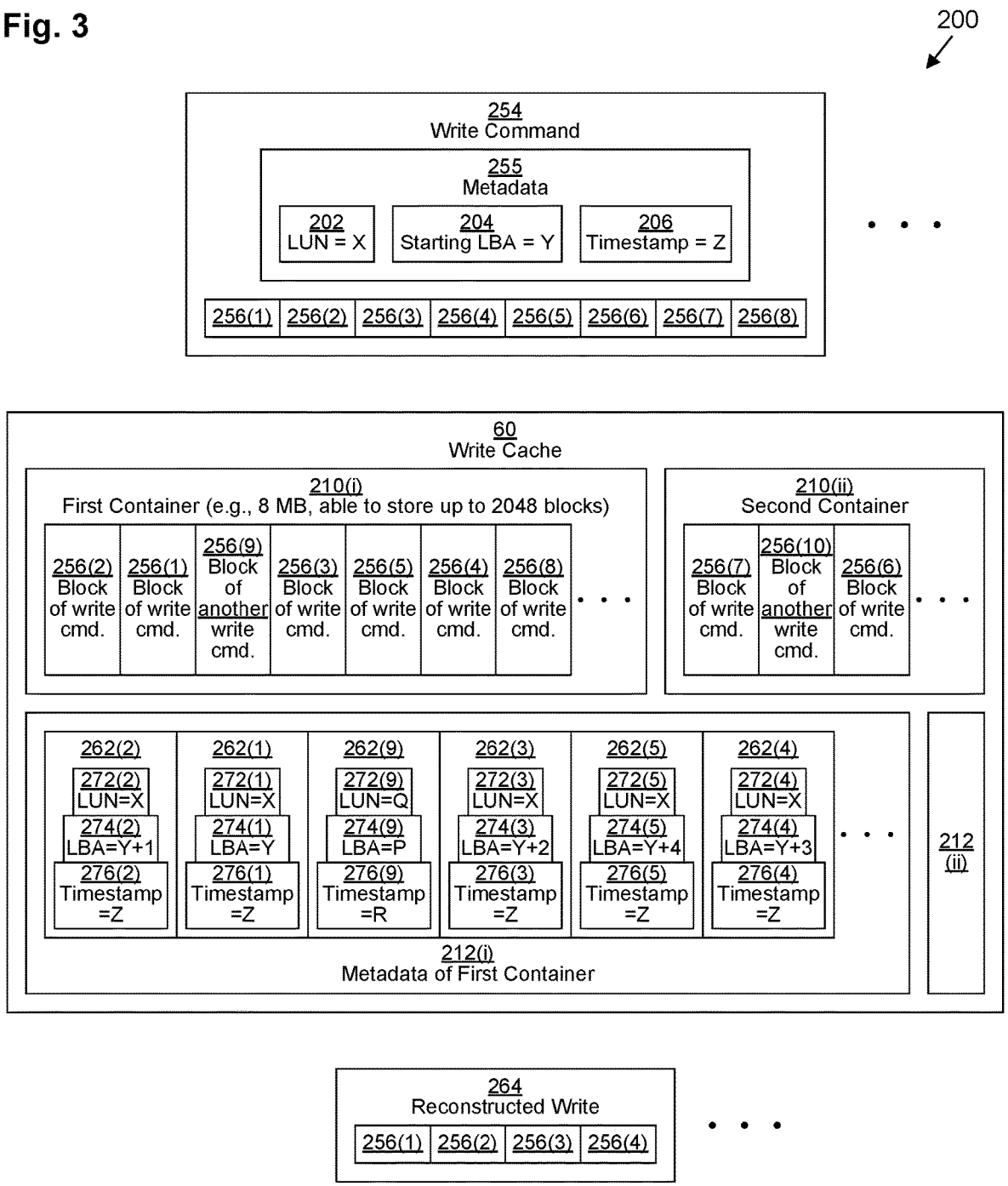
FIG. 3 is a block diagram depicting an example arrangement of data structures for use in connection with various embodiments.

FIG. 3 presents an example data structure configuration 200 that is helpful in understanding method 100. In FIG. 3, an example write command 254 directs (using metadata 255 of the write command 254) that 32 KB of data (i.e., eight blocks 256(1)-256(8)) be written to a particular LUN X (see LUN metadata 202) sequentially starting at starting LBA Y (see starting LBA metadata 204). In some embodiments, the metadata 255 also includes a timestamp 206, indicating that the write command 254 was either issued or received (e.g., by host interface layer 46) at time Z. After the data of the write command 254 is broken up and processed by caching layer(s) 48, block 256(2) is inserted first into the write cache 60, followed by block 256(1) (i.e., out of order). As depicted, another block 256(9), which is part of another write command 54, happens to be inserted into the write cache 60 next, prior to insertion of block 256(3) (i.e., commingled). Blocks 256(5), 256(4), 256(8), and 256(7) follow in that order. Another block 256(10) of another write command 54 happens to be inserted into the write cache 60 next, prior to insertion of block 256(6).

As each block 256 is inserted into the write cache 60, associated metadata 262 for each block 256 is also stored in the write cache 60 in connection therewith. Thus, as block 262(2) is inserted into the write cache 60, associated metadata 262(2) is also written to the write cache 60, including LUN metadata 272(2) (indicating LUN X, copied from LUN metadata 202 of the write command 254), LBA metadata 274(2) (indicating LBA Y+1 because block 256(2) is offset by one block from the first block 256(1) of the write command 254 which is targeted at LBA Y), and timestamp 276(2) (indicating time Z, copied from timestamp 206 of the write command 254). Each block 256(1)-256(8) of the write command 254 has the same LUN metadata 272 and timestamp 276, copied from metadata 255 of the write command 254, but the LBA metadata 274 is adjusted for each block 256 based on its offset within the data of the write command 254.

Returning to FIG. 2, in some embodiments, in step 120, deduplication layer 50 determines a size of a set of data. At this point, deduplication layer 50 has direct access to the write cache 60 but not to the original write command 54. In some embodiments, deduplication layer 50 generates a reconstructed write 64 by performing sub-step 122, in which it searches for blocks 56 in a portion of the write cache 60 (e.g., a container 210 that is about to be flushed to persistent storage 32—see FIG. 3) having metadata 62 indicating that they belong to the same write command 54.

Looking at FIG. 3 again, write cache 60 may contain several containers 210 (depicted as containers 210(i), 210(ii)). Container 210(i) is first filled with blocks 256. In some embodiments, a container 210 becomes "filled" with blocks 256 once it contains a threshold maximum number (e.g., 2048) of blocks 256. Once the first container 210(i) is full, additional blocks 256 are inserted into the second container 210(ii) as they are received, and deduplication layer 48 begins performing deduplication on first container 210(i) in preparation for it to be flushed to persistent storage 32. This deduplication begins with step 120 of FIG. 2, as reconstructed writes 264 are generated in sub-step 122.

Returning to FIG. 2, in some embodiments, sub-step 122 (described in connection with processing first container 210(i)) may include sub-sub-steps 124 and 126. In sub-sub-step 124, deduplication layer 48 searches for blocks 256 within first container 210(i) whose respective metadata 262 (within metadata portion 212(i) for the first container 210(i)) indicates that: (a) they are directed at the same logical disk (i.e., blocks 256 whose LUN metadata 272 are identical); (b) they are directed at consecutive logical block addresses (i.e., blocks 256 whose LBA metadata 274 are sequential without any gaps); and (c) they were received at the I/O stack simultaneously (i.e., blocks 256 whose timestamps 276 are identical). With reference to FIG. 3, performance of sub-sub-step 124 yields blocks 256(1)-256(5).

Then, in sub-sub-step 126, deduplication layer 48 finds the largest consecutively-addressed set of blocks 256 such that the set has an integral-power-of-2 number of blocks 256 within a range of [2, 32] (indicating between 2 and 32 blocks, inclusive). Thus, ranges of 2, 4, 8, 16, and 32 consecutive blocks 256 are searched for, although, in other embodiments, some of these may be omitted (e.g., only 8 and 16 consecutive blocks may be searched for in some embodiments). The lengths searched for correspond to the number of blocks 56 defining each of the digest DBs 70 (thus, in the example of FIG. 1, lengths of 2, 4, 8, and 16 blocks 56 are searched). With reference to FIG. 3, performance of sub-sub-step 126 could yield two possible sets: {blocks 256(1)-256(4)} and {blocks 256(2)-256(5)}. In some embodiments, sub-sub-step 126 includes sub-sub-sub-step 128, in which, if there is more than one set found (e.g., multiple sets offset from each other by one or more starting addresses), then deduplication layer 48 applies a heuristic to select a particular one. For example, in one embodiment, the set whose starting block has the lower LBA 274 is selected (i.e., {blocks 256(1)-256(4)}). In another embodiment, a more complex heuristic is applied, looking at sets of nearly-adjacent blocks 256 that satisfy conditions (a) and (c) but with small gaps in between their LBAs 274 to guess where the most likely starting point is. Thus, in the example of FIG. 3, since container 210(i) contains blocks 256(1)-256(5) and 256(8) with a gap of two LBAs 274 (corresponding to blocks 256(6) and 256(7) which were placed in container 210(ii)), deduplication layer 48 may ascertain that write command 254 may have originally had eight blocks 256 starting with block 256(1), so it chooses block 256(1) as the starting position.

Thus, after step 120, deduplication layer 48 may have generated reconstructed write 264 which contains blocks 256(1)-256(4). It should be understood that reconstructed write 264 may not actually be "generated" in the traditional sense—it may merely represent a logical intermediary used in method 100.

In step 130, deduplication layer 48 hashes a subset of the set of data (e.g., blocks 256(1)-256(4) of reconstructed write 264 generated in step 120), yielding a representative digest 66. In some embodiments, step 130 includes sub-step 132 in which deduplication layer 48 hashes the first sector (e.g., the first 512 bytes) of the set of data. In other embodiments, step 130 includes sub-step 134 in which deduplication layer 48 hashes the first block 56 (e.g., block 256(1)) of the set of data. In yet other embodiments, step 130 includes sub-step 136 in which deduplication layer 48 hashes a concatenation of the first block 56 (e.g., block 256(1)) and the last block 56 (e.g., block 256(4)) of the set of data.

In some embodiments, step 140 may follow step 130. In step 140, deduplication layer 48 hashes a last block (e.g., block 256(4)) at a tail end of the set of data, yielding a secondary representative digest 66'. In some embodiments, step 140 may be delayed until the middle of step 150, as described below.

Finally, in step 150, deduplication layer 48 performs deduplication on the set of data based at least in part on matching the representative digest 66 to a digest already stored in a digest DB 70 that relates digests to locations of data from which the digests were produced. In some embodiments, after step 150 has been performed on all of the blocks 256 of a container 210, persistence layer 52 may flush the deduplicated container 210 to persistent storage 32, possibly also applying compression.

FIG. 4 illustrates an example method 300 performed by deduplication layer 48 for implementing step 150. It should be understood that one or more of the steps or sub-steps of method 300 may be omitted in some embodiments. For example, steps 330, 340, 360, and 370 are depicted with dashed lines, indicating that they are either optional or representative of alternative embodiments. Similarly, in some embodiments, one or more steps may be combined together or performed in a different order.

In step 310, deduplication layer 48 selects a particular digest DB 70 from a set of digest DBs 70 assigned to respective sizes by selecting the digest DB 70 assigned to the determined size that was determined in step 120 of method 100. For example, in the example of FIG. 1, deduplication layer 48 selects second digest DB 70(II) in step 310 since reconstructed write 64(a) has four blocks 56(1)-56(4). However, in an alternate scenario based on FIG. 3 in which all of the blocks 256(1)-256(8) of write command 254 were all placed in the same container 210, reconstructed write 264 would have eight blocks 256(1)-256(8), and in that scenario, deduplication layer 48 would select third digest DB 70(III) in step 310.

Then, in step 320, deduplication layer 48 searches the selected digest DB 70 (e.g., initially second digest DB in the example of FIG. 1) for an entry that is keyed by the representative hash digest 66(a). If such an entry is found, it means that another chunk of the selected size (e.g., four blocks 56 in the example of FIG. 1) was previously stored in persistent storage 32 and its representative hash digest 66 was the same as the representative hash digest 66(a) of the reconstructed write 64(a). However, since only a subset of the reconstructed write 64(a) was used to generate the representative hash digest 66(a), it is not clear if the reconstructed write 64(a) is actually the same as the previously-stored chunk. Thus, after step 320 yields an affirmative result, step 330 and/or step 340 may also be performed to confirm the match. In step 330, deduplication layer 48 compares the secondary digest 66'(a) with a last block digest found in the entry found in step 320 to determine whether the last block 56 of the previously-stored chunk may be the same as the last block 56(4) of the reconstructed write 64(a). However, even if this yields an affirmative result, it is possible that the middle blocks 56(2), 56(3) of the reconstructed write 64(a) do not match the middle blocks 56 of the previously-stored chunk. Thus, operation may proceed with step 340 in which the deduplication layer 48 compares the contents of the data of the reconstructed write 64(a) to the contents of the previously-stored chunk. In some embodiments (e.g., if a strong hash, such as SHA-2 or stronger, is used), only blocks 56 (e.g., middle blocks 56(2), 56(3)) that were not represented by either the representative hash digest 66(a) or the secondary digest 66' (a) are compared to the corresponding blocks 56 of the previously-stored chunk. If step 340 yields an affirmative result, then, in step 350, the entire reconstructed write 64(a) is deduplicated by refraining from storing blocks 56(1)-56(4) in persistent storage 32 and instead storing metadata in persistent storage 32 that points to the previously-stored chunk.

If any of steps 320, 330, 340 yields a negative result, then no previously-stored chunk represented by the selected digest DB 70 (e.g., 70(II)) is the same as the reconstructed write 64(a). In some embodiments, operation proceeds directly with step 380, in which the deduplication layer 48 inserts a new entry into the selected digest DB 70 (e.g., 70(II)) keyed by the representative hash digest 66(a) so that future reconstructed write 64 can be deduplicated against the current reconstructed write 64(a). However, in other embodiments, step 360 may be performed instead.

In step 360, deduplication layer 48 determines whether there is another digest DB 70 that is assigned to smaller chunks than the selected size. If so, operation proceeds with step 370 in which the digest DB 70 assigned to the next-smaller sized chunk is selected and the reconstructed write 64 is adjusted so that it is a smaller size, with operation then returning back to step 320, looping until either step 350 is performed or until step 360 yields a negative result. When step 360 yields a negative result, operation proceeds with step 380, ending method 300.

Thus, in the example of FIG. 1, if the representative hash digest 66(a) is not initially found in second digest DB 70(II), then step 360 yields an affirmative result because first digest DB 70(I) is assigned to smaller chunks. In step 370, blocks 56(3), 56(4) are removed from the reconstructed write 64(a), and first digest DB 70(I) is selected in place of second digest DB 70(II). If necessary, digests 66, 66' may also be recalculated. Operation then returns back to step 320 so that first digest DB 70(I) can be searched.

It should be noted that in some embodiments, step 140 of method 100 may be deferred until just after step 320 (and just prior to step 330) of method 300. This allows the secondary digest 66' to be computed only as needed and to be recomputed if the reconstructed write 64(a) is adjusted.

Thus, techniques have been presented for performing deduplication at a coarser granularity than the standard block size. This may be accomplished by grouping multiple blocks 56, 256 together into a chunk and using a representative subset of that chunk to generate a hash digest 66 for the entire chunk. This digest 66 can then be used to perform deduplication at a chunk level. In some embodiments, blocks 56, 256 are grouped together based on their being received together in a single write command 54, 254. In some embodiments, blocks 56, 256 are joined together once the various blocks 56, 256 of a write command 54, 254 have already been broken apart and separately added to a write cache 60 out-of-order and/or commingled with blocks 56, 256 from other writes. Such joining may be achieved by referencing metadata 62, 262 included with each block 56, 256 in the cache 60 to identify what data was received in the write command 54, 254 (e.g., as reconstructed write 64, 264). In some embodiments, multiple digest databases 70 may be used to store digests for chunks of data of respective sizes (e.g., generated by different applications).

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, as used herein and unless a specific statement is made to the contrary, the word "subset," when used in connection with a "set," refers to a strict (or proper) subset of the set, meaning that the set includes at least one element not included within the subset.

Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method comprising:
   receiving a write command that specifies a set of data, the set of data including multiple blocks of data;
   hashing a subset of the set of data, yielding a representative digest of the set of data;
   determining a size of the set of data; and
   performing deduplication on the set of data based at least in part on matching the representative digest to a digest already stored in a database which relates digests to locations of data from which the digests were produced, databases assigned to respective sizes by choosing the database that is assigned to the determined size.

2. The method of claim 1 wherein determining the size of the set of data is performed after the multiple blocks have been stored in a write cache commingled with other blocks of data that are part of other write commands.

3. The method of claim 2 wherein determining the size of the set of data includes searching the write cache for blocks having associated metadata indicating that they:
   (a) were received simultaneously and
   (b) are to be written to consecutive addresses of a same logical disk.

4. The method of claim 3 wherein searching the write cache further includes searching for a group of blocks having exactly an integer-power-of-2 number of blocks within a range from 2 through 32, inclusive.

5. The method of claim 1 wherein the set of databases include at least a first database and a second database respectively assigned to sizes of 16 kilobytes and 64 kilobytes.

6. The method of claim 1 wherein the set of databases includes at least 2 databases respectively assigned to an integer-power-of-2 byte size within a range of $[2^{12}, 2^{17}]$ bytes.

7. The method of claim 1 wherein performing deduplication on the set of data is further based on, in response to matching the representative digest to the digest already stored in the database, successfully comparing the set of data with data identified by the database in connection with the representative digest.

8. A method comprising:
   receiving a write command that specifies a set of data, the set of data including multiple blocks of data;
   hashing a subset of the set of data, yielding a representative digest of the set of data, wherein the subset includes a first block at a beginning of the set of data;
   hashing a last block at a tail end of the set of data, yielding another representative digest of the set of data; and
   performing deduplication on the set of data based at least in part on matching the representative digest to a digest already stored in a database which related digests to locations of data from which the digests were produced;
   wherein matching the representative digest to the digest already stored in the database includes finding an entry of the database keyed by the representative digest; and wherein performing deduplication on the set of data is further based on determining, in response to finding the entry, that the entry also includes the other representative digest.

9. The method of claim 8 wherein performing deduplication on the set of data is further based on, in response to determining that the entry also includes the other representative digest, successfully comparing the set of data with another set of data identified by the entry.

10. An apparatus comprising processing circuitry coupled to memory configured to:
    receive a write command that specifies a set of data, the set of data including multiple blocks of data;
    hash a subset of the set of data, yielding a representative digest of the set of data;
    determine a size of the set of data; and
    perform deduplication on the set of data based at least in part on matching the representative digest to a digest already stored in a database which relates digests to locations of data from which the digests were produced, wherein performing deduplication includes selecting the database from a set of databases assigned to respective sizes by choosing the database that is assigned to the determined size.

11. The apparatus of claim 10, wherein the subset includes a first block at a beginning of the set of data.

12. A computer program product comprising a non-transitory computer-readable storage medium storing instructions, which, when executed by processing circuitry, cause a computing device to:
    receive a write command that specifies a set of data, the set of data including multiple blocks of data;
    hash a subset of the set of data, yielding a representative digest of the set of data;
    determine a size of the set of data; and
    perform deduplication on the set of data based at least in part on matching the representative digest to a digest already stored in a database which relates digests to locations of data from which the digests were produced, wherein performed deduplication includes selecting the database from a set of databases assigned to respective sizes by choosing the database that is assigned to the determined size.

13. The computer program product of claim 12, wherein the subset includes a first block at a beginning of the set of data.

\* \* \* \* \*